United States Patent
Lake et al.

(10) Patent No.: US 8,182,701 B2
(45) Date of Patent: May 22, 2012

(54) METHOD OF OPTIMIZING FEED DISTRIBUTION IN A SEDIMENTATION VESSEL

(75) Inventors: Philip Lake, Murray, UT (US); Mark Crozier, Gauteng (ZA)

(73) Assignees: WesTech Engineering, Inc., Salt Lake City, UT (US); Paste Thick Ventures, LLC, Salt Lake City, UT (US)

( * ) Notice: Subject to any disclaimer, the term of this patent is extended or adjusted under 35 U.S.C. 154(b) by 149 days.

(21) Appl. No.: 12/633,527

(22) Filed: Dec. 8, 2009

(65) Prior Publication Data

US 2011/0132850 A1 Jun. 9, 2011

(51) Int. Cl.
*B01D 21/24* (2006.01)
(52) U.S. Cl. ...... 210/801; 210/207; 210/519; 210/532.1
(58) Field of Classification Search .......... 210/800, 210/801, 206, 519, 528, 532.1, 207
See application file for complete search history.

(56) References Cited

U.S. PATENT DOCUMENTS

| | | | |
|---|---|---|---|
| 2,138,274 A | 11/1938 | Greenfield | |
| 3,227,278 A * | 1/1966 | Johnson | 210/519 |
| 3,495,254 A | 2/1970 | Clemens | |
| 4,270,676 A | 6/1981 | Green | |
| 5,147,556 A | 9/1992 | Taylor | |
| 5,490,920 A | 2/1996 | Fruchtbaum et al. | |
| 5,833,865 A | 11/1998 | Harato et al. | |
| 5,944,995 A | 8/1999 | Sethi | |
| 6,276,537 B1 | 8/2001 | Esler | |
| 6,966,985 B2 * | 11/2005 | Schoenbrunn et al. | 210/207 |
| 7,591,946 B2 | 9/2009 | Taylor | |
| 7,981,299 B2 * | 7/2011 | Triglavcanin et al. | 210/519 |
| 2003/0136730 A1 * | 7/2003 | Schneider et al. | 210/519 |
| 2004/0020847 A1 | 2/2004 | Wright | |
| 2005/0115907 A1 | 6/2005 | Taylor | |
| 2005/0252868 A1 | 11/2005 | Albertson | |
| 2007/0209996 A1 * | 9/2007 | Zhou | 210/519 |
| 2009/0173701 A1 | 7/2009 | Egan, III | |
| 2010/0187191 A1 * | 7/2010 | Triglavcanin | 210/801 |

OTHER PUBLICATIONS

Comings et al. "Continuous Settling and Thickening." Industrial and Engineering Chemistry [online], Jun. 1954 [Retrieve on Oct. 26, 2010], vol. 46, No. 6, pp. 1164-1172, Retrieved from the Internet: <URL: http://pubs.acs.org>.
International Search Report for PCT/US2010/049443, Nov. 8, 2010.
Written Opinion for PCT/US2010/049443, Nov. 8, 2010.

* cited by examiner

*Primary Examiner* — Christopher Upton
(74) *Attorney, Agent, or Firm* — Austin Rapp & Hardman

(57) ABSTRACT

A feed structure may be used in conjunction with a sedimentation vessel in order to separate solids and liquids, which may be in a slurry, from each other. The feed structure comprises a feed chamber housing a central wall. At least one port is positioned at the base of the chamber. A feedwell that is substantially concentric with the feed chamber is also used. The feed chamber is in communication with the feedwell, wherein slurry flows through the said port to access the feedwell. An outlet is positioned on the feedwell (such as near the bottom of the feedwell). Slurry may flow through the outlet into the sedimentation vessel.

16 Claims, 5 Drawing Sheets

US 8,182,701 B2

METHOD OF OPTIMIZING FEED DISTRIBUTION IN A SEDIMENTATION VESSEL

TECHNICAL FIELD

The present invention relates generally to sedimentation vessels used for separation of solids and liquids. More specifically, the present invention relates to a new type of feedwell or feed system used in a sedimentation vessel.

BACKGROUND

Many commercial facilities (such as mining facilities, manufacturing facilities, chemical facilities, water treatment facilities or other facilities) use water or liquid for or as part of their process(es). Often the liquid contains various solids or particles, making it desirable or even necessary to separate out the solids from the liquid. One type of structure that is used to separate out solids from liquids is a sedimentation vessel.

Sedimentation vessels are routinely used in performing solid/liquid separation in industry. Sometimes, the names "thickener" or "clarifier" are used to generally describe sedimentation vessels. In sedimentation vessels, liquids and solids are separated from each other by gravity as described in principles explained by Stokes Law. Generally, the solids and liquids are in a slurry form and are introduced into the separation vessel via a feedwell (which is sometimes referred to as a "feed well"). However, sedimentation vessels generally suffer form a number of deficiencies. For example, in many of these vessels, the slurry is not evenly received from the feedwell into the separation vessel, thus making it inefficient to separate the solids from the liquids.

It is desirable to create a new type of feed structure (for a sedimentation vessel) that can more evenly distribute the slurry within the sedimentation vessel, thereby improving the efficiency of the separation process. Such a device is disclosed herein.

The issues associated with uneven distribution of solids into the sedimentation vessel are known and several patents have been issued addressing this problem. An example is U.S. Pat. No. 6,276,537 which uses plurality of outlet structures extending from a single chamber feedwell in an attempt to direct the slurry evenly in to the sedimentation vessel. The described embodiment of this patent is a closed bottom, except for the plurality of outlets. This structure has the potential of allowing coarse particle to settle out in the chamber. U.S. Patent Publication No. 2009/173701 also uses a single chamber system but attempts to produce an even distributed flow leaving the feedwell with a series of baffles. The described embodiment has a tapered roof that directs the feed stream from the center out to the walls were the baffles are located. In addition to employing different approaches to produce even distribution of the slurry into the sedimentation vessel, each of these single chamber patents requires combining the distribution of flow and flocculation of the feed stream in the one chamber. A dual chamber feedwell system is found in U.S. Pat. No. 7,591,946 to optimize the mixing, residence time and distribution of the solutions for flocculation and is offered as an alternative to upstream mixing tanks. The first zone receives the feed slurry, dilution water if needed and the flocculant solution stream. This first zone or chamber provides motor driven agitators to give the mixing needed to flocculate the solids. The slurry then overflows the zone into a second zone through an outlet located "centrally above the floor" of the first chamber. The location of the chamber one outlet is to provide the residence time by requiring the slurry to flow up and over the outlet. The transition between the two zones would be laminar flow to prevent breakage of the floccules produced. The slurry in the second zone flows "downward under gravity" toward a deflector cone at the bottom of this second chamber, which direct the flow evenly into the thickener.

BRIEF SUMMARY OF THE INVENTION

A feed structure for use with a sedimentation vessel is disclosed. The feed structure comprises a feed chamber housing a central wall. At least one port is positioned at the base of the chamber. The feed structure also includes a feedwell that is substantially concentric with the feed chamber, wherein the feed chamber is in communication with the feedwell, and wherein slurry flows through the port to access the feedwell. The feed structure also includes an outlet. The outlet is positioned on the bottom of the feedwell and slurry will flow through the outlet into the sedimentation vessel. In some embodiments, the feed chamber may have additional ports positioned at the base of the central wall. In other embodiments, the feed chamber port is a continuous gap, wherein the gap extends around the entire circumference of the central wall. In some embodiments, the central wall is conical or cylindrical in shape. The slurry may flow generally diagonally and/or downwardly when passing through the port into the feedwell. In other embodiments, at least a part of the feed chamber may be positioned above the feedwell. Further embodiments may be constructed such that when the slurry exits the feedwell, the slurry has a concentric flow pattern within the sedimentation vessel.

The present embodiments also disclose a method for increasing efficiency within a sedimentation vessel. The method comprises obtaining a feedwell, the feedwell comprising an outlet through which slurry may flow into a sedimentation vessel. The method also comprises obtaining a feed chamber, the feed chamber comprising an internal central wall and at least one port positioned at the base of the chamber. The feed chamber is then installed proximate the feedwell such that when installed, the slurry will pass through the feed chamber to the port, through the port to access the feedwell, through the feedwell to the outlet, and through the outlet into the sedimentation vessel. In some embodiments, the feed chamber is retro-fit onto an existing feedwell.

As noted herein, the feed system may be designed for use with a sedimentation vessel and may be capable of receiving a quantity of feed slurry and delivering the slurry into the sedimentation vessel. The feed slurry comprises a mixture of solids and liquids, which are separated from one another in the sedimentation vessel.

In some embodiments, the feed system comprises a feed chamber (which is also called a "feed distribution chamber") that adds the feed slurry to the feedwell. The feed chamber may be positioned upstream of the feedwell. The feed chamber may be concentric with the feedwell. A portion of the feed chamber may be positioned above the top of the feedwell. The slurry enters the feed chamber before being allowed to access the feedwell.

The feed chamber has a narrow opening (which is referred to as a "port") below the top surface of the feedwell. The slurry must flow through the opening in order to access the feedwell. This opening introduces a pressure differential between the incoming feed of slurry (higher pressure) and the feedwell (lower pressure). The area of the feed chamber proximate the opening has a higher flow velocity than other areas of the feed chamber. This higher flow rate creates friction and turbulence within the feed chamber, especially around the areas of the higher flow. This turbulence creates an inherent resistance to the flow. Accordingly, slurry entering the feed chamber will generally follow the path of least resistance, and as the resistance to flow is higher in areas experiencing higher flow rates than areas of lower flow, the lower flow areas will attract more of the incoming slurry. This balances the flow within the feed chamber and ensures that the entering slurry is drawn to all areas of the feed chamber.

The slurry entering the feed chamber may be, in one embodiment, introduced tangentially (e.g., from the side of the feed chamber). Angular momentum will thus carry the slurry in a circular manner in the feed chamber, thereby minimizing ability of fine solid particles ("fines") from segregating out from heavier solid particles. This circular flow also assists in ensuring that the entering slurry reaches the furthest parts of the feed chamber in a homogeneous (or substantially homogeneous) manner. The segregation of the solid material into fines and heavier particles should be avoided (in some embodiments) in order to reduce or prevent the uneven deposition of heavier solids in isolated areas of the sedimentation vessel. If the heavier particles separate out from the fines, these heavier particles will form deposits within the sedimentation vessel (which may be referred to as "sand islands") and will drastically reduce the efficiency of the separation process. By introducing the slurry tangentially into the feed chamber, the possibility of formation of sand islands is reduced.

In some embodiments, the feed chamber is cylindrical and is designed such that the flow out of the feed chamber (into the feedwell) is directed radially outward and downward toward the outer wall of the feedwell. At the same time, the outlet of the feedwell is positioned at the bottom and center of the feedwell. This means that the flow path of the feed slurry has to change direction back toward the center of the sedimentation device. By forcing the slurry to change direction, a more efficient separation process may be achieved by negating the possibility of short circuiting, whereby slurry exits the feedwell in a direct path.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments, as represented in the Figures, is not intended to limit the scope of the invention, as claimed, but is merely representative of presently preferred embodiments of the invention.

Figure 1:
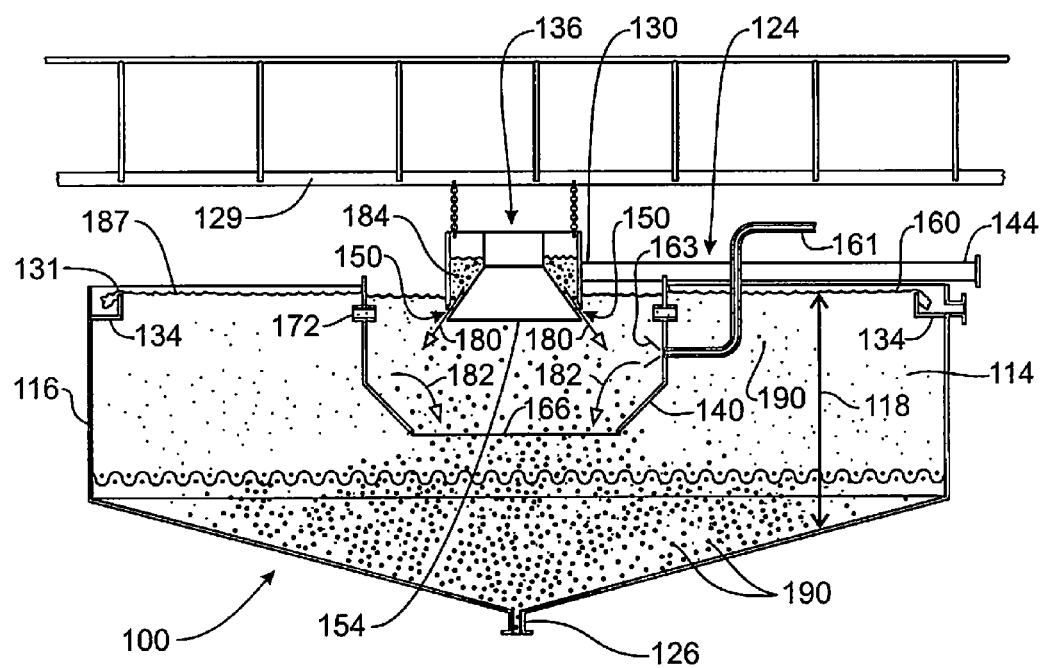
FIG. 1 is cross-sectional view of an embodiment of a sedimentation vessel that includes a feed system according to the present embodiments.

Referring now to FIG. 1, a cross sectional view of a sedimentation vessel 100 is shown. The sedimentation vessel 100 may be referred to as a thickener or a clarifier. It should be noted that the configuration of the sedimentation vessel 100 is provided for illustrative purposes only. There are a variety of other configurations that may be used for the sedimentation vessel 100. For example, the sedimentation vessel 100 may be rectangular, circular, or any other desired shape.

As its name suggests, the sedimentation vessel 100 is designed to separate most of the solid particles 190 or materials from a liquid 187. Such a separation process occurs because of principles explained by Stokes law, wherein the solids 190 settle to the bottom of the sedimentation vessel 100 while the clarified liquid 187 is extracted from the top of the vessel 100. The sedimentation vessel 100 includes a separation chamber 114, which in the embodiment of FIG. 1, is shown as a cylindrical unit. As noted above, other configurations are also possible. The separation chamber 114 is defined by one or more outer walls 116. The volume within the chamber 114 comprises the separation zone 118, which is a zone where separation of the solids and liquids occurs because of, for example, the force of gravity. (The separation zone may span the entire vertical height of the chamber 114). As the solids 190 settle to the bottom of the chamber 114, scrapers or gravity may be used to accumulate thickened slurry at the bottom of the chamber 114 into an exit 126.

When added to the sedimentation vessel 100, the solids 190 and liquids 187 are generally combined into a slurry 184 (which may also be referred to as a "feed slurry"). The majority of solids 190 will settle to the bottom of the separation zone 118, and the liquid 187, that may still contain solids 190, will rise to the top of the vessel 100. The separation process may be continuous when the rise rate or upflow velocity of the feed slurry 184 in the vessel 100 (i.e., the rate at which the slurry rises in the vessel 100) is lower than the settling velocity of the majority of solids 190 contained in the feed slurry 184. A continuous process means that the process may be continuously run, with a new quantity of slurry being consistently injected into the vessel 100.

The clarified liquid 187 found in the chamber 114 will generally be collected at or near the top of the chamber 114. Specifically, a weir 131 may be used such that the liquid can overflow from the weir 131 (which may be a "vee notch" weir) and be captured into a launder 134.

The sedimentation vessel 100 includes a feed system 124. The feed system 124 may be designed to introduce the solid and liquid mixture (slurry) into the separation zone 118.

There are a variety of different types of feed systems 124. FIG. 1 shows a feed system 124 that comprises a feed pipe 130 that delivers the solid/liquid mixture (or slurry) into a feed chamber 136. This feed chamber 136 distributes the feed evenly (as described herein) into a feedwell 140. One or more external tanks (or other collection/storage structures, which are not shown in FIG. 1) may also be used as part of the feed system 124.

The feed slurry may be introduced into the feed system 124 via an inlet 144. The inlet 144 may be any structure that is capable of receiving a quantity of the feed slurry 184 and/or introducing the feed slurry into the feed system 124. The inlet 144 may be positioned on a feed pipe 130, feed chamber 136, or other feed structure (such as an external tank). In the embodiment of FIG. 1, the inlet 144 is located at the entry of the feed pipe 130. The feed chamber 136 may be attached to a bridge 129 (or walkway) that is positioned above the feedwell 140.

The slurry 184 enters the feed system 124 via the inlet 144 and then flows (such as via the pipe 130) into the feed chamber 136. One or more ports 150 are positioned on the feed chamber 136, such as for example, at the base 154 (bottom) of the feed chamber 136. The slurry is allowed to exit the feed chamber 136 into the feedwell 140 by passing through one or more port(s) 150. Each port 150 may be in the form of openings or a continuous gap in the wall of the feed chamber 136. In some embodiments, the port 150 may be submerged below the surface 160 of the liquid 187 in the sedimentation vessel 100. The port 150 may also be positioned below the top of the feedwell 140.

The feed system 124 also includes an outlet 166 which allows all of feed slurry to exit the feed system 124 into the sedimentation vessel 100. In the embodiment of FIG. 1, the outlet 166 may be an open bottom of a feedwell 140. Other types of outlets may also be used. Further, embodiments may be constructed in which optional ports 172 and/or gates (not shown) on the feedwell 140 allow lower density liquid 187 from the exterior of the feedwell 140 to flow into the interior of the feedwell 140. The interior slurry may be generally at a higher specific gravity than the liquid exterior to the feedwell, and thus a density gradient may operate to force the lower density liquid through the ports 172.

As noted above, a variety of different feed systems 124 are possible within the present embodiments. For example, the feed system may comprise a feed distributer, a feed pipe, and/or a feed launder. Such structures may be used in addition to a feed chamber 136/feedwell 140 combination. All of these feed systems 124 may be used in sedimentation vessels 100.

This embodiment of a feed structure 124 also dissipates feed stream velocity and momentum. Specifically, when the slurry enters the feed chamber 136, the chamber dissipates the kinetic energy associated with the flowing slurry. The feed slurry 184 then proceeds to the feedwell 140 through the narrow port 150 in a non-segregated manner such that the flow of the slurry has an even flow pattern. When the slurry enters the feedwell 140 in this manner, the user can control the processes in the feedwell 140 such that the addition of dilution water (or liquid) through ports 172 and/or the addition of chemicals 163 (e.g., via pipe 161) used for conditioning, coagulation and flocculation may be done in a controlled and proportional manner that optimizes reaction kinetics, chemical efficiency and solids settling characteristics. Thus, the conditions associated with the separation may be optimized for each particular application using the feed system 124. Using the present embodiments, dilution of the feedwell 140, flocculation of the feedwell 140 (e.g., via chemicals 163) and/or even distribution of the slurry exiting the feedwell 140 may all be obtained, even for a feedwell 140 having a large diameter.

The introduction of the feed into the separation zone 118 at a relatively uniform velocity and direction can be important both in terms of the efficiency of the sedimentation device and the solid's settling characteristics. Thus, in certain embodiments, the flow pattern inside the feedwell 140 is generally directed radially outward (as shown by arrows 180) at a downward angle from horizontal from the feed chamber 136 into the feedwell 140. The flow then has to change direction back towards the center (as shown by the arrows 182) in order to exit the feedwell 140. This change in direction and even flow distribution limits "short circuiting" of the sedimentation vessel. Short circuiting is when a proportionally higher velocity flow stream inside the separation chamber 114 is directed at the overflow weir 131. (In other words, a disproportionate amount of the slurry 184 is directed towards one area of the sedimentation vessel 100, thereby resulting in inefficient operation of the device). Short circuiting will result in the undesired carry over of solids into the launder 134. If short circuiting occurs, it must be overcome by using more chemicals and/or slowing the flow of the slurry, thereby reducing the efficiency of the sedimentation device 100.

Figure 2A:
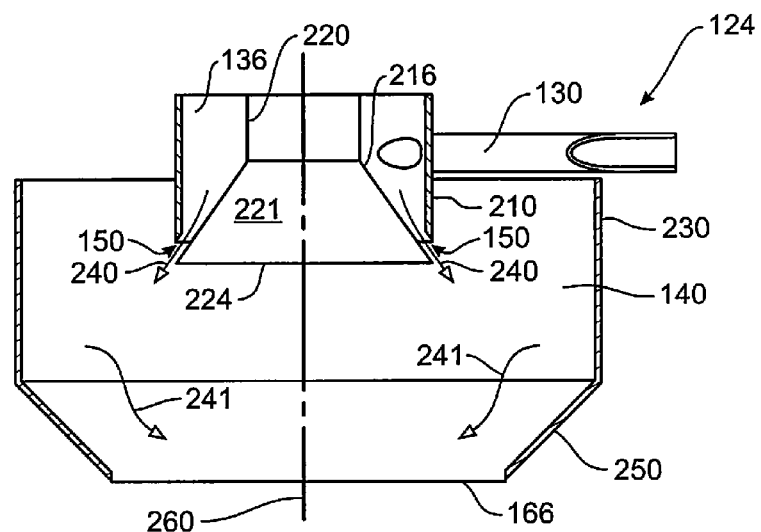
FIG. 2A is cross-sectional view of the embodiment of the feed system of FIG. 1.
Figure 2B:
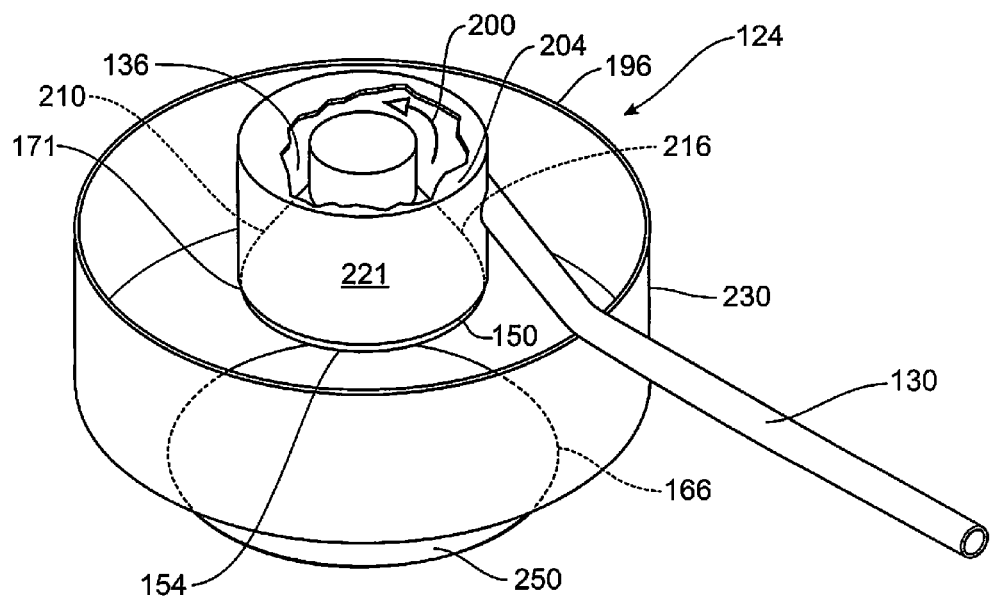
FIG. 2B is a perspective view of the embodiment of the feed system of FIG. 1.

Referring now to FIGS. 2A and 2B, the feed system 124 of FIG. 1 will be described in greater detail. FIG. 2A is a cross-sectional view of the feed system 124 whereas FIG. 2B is a perspective view of the same structure. The feed structure 124 may be used in the sedimentation vessel, for example, as shown in FIG. 1. All or a portion of the feed chamber 136 may be positioned above the top 196 of the feedwell 140.

The slurry 184 is not shown in FIG. 2A or 2B for purposes of clarity. The slurry 184 will flow through the feed pipe 130 and will enter the feed chamber 136. As can be seen from FIGS. 2A and 2B, the slurry 184 may be introduced into the feed chamber 136 in a tangential manner (e.g., parallel or substantially parallel to the top of the feedwell 140).

Angular momentum of the slurry 184 entering the chamber 136 will carry solids in a circular manner (as shown by the arrow 200 in FIG. 2B) in the feed chamber 136, thereby minimizing the segregation of the fine solid materials ("fines") and the heavier solid particles. This circular flow 200 also assists in ensuring that the flow of the slurry reaches the furthest end 204 of the feed chamber 136 from the feed pipe 130 in a homogeneous or a substantially homogeneous manner. The segregation of solids (into fines and heavy solid particles) within the feed chamber 136 or the feedwell 140 should be avoided to reduce uneven deposition of the heavier solids in isolated areas (sometimes referred to as "sand islands"). The formation of such sand islands will create torque spikes or trip the drive mechanisms in sedimentation vessels using a raking device, or (where rakes are not used) lead to slumping (sinking) of built up solids that may operate to plug the sedimentation device.

The feed chamber 136 includes a port 150. As shown in FIGS. 2A and 2B, the port 150 is positioned at the base 154 of the feed chamber 136. The feed slurry 184 flows through the port 150 into the feedwell 140. In the shown embodiment, the port 150 is a continuous gap 150 that extends around the circumference 171 of the feed chamber 136. In other embodiments, the port 150 may be one or more openings (holes) through which the slurry 184 may flow.

There is a potential that solids within the slurry may buildup and/or block the port 150. This blockage is undesirable as it will inhibit the flow of the slurry 184 into the feedwell 140. In order to reduce the likelihood of such blockages, the walls 210 of the feed chamber 136 are vertical or at a steep angle relative to horizontal. The use of such steep wall angles reduces the likelihood that solids will build up and result in a blockage occurring.

A central wall 216 may be positioned within the feed chamber 136. As shown in FIGS. 2A and 2B, the central wall 216 is generally conical in shape, meaning that it is tapered such that a top portion 220 of the wall 216 has a smaller diameter than a bottom portion 221 (conical portion) of the wall 216. The bottom 224 of the wall 216 is positioned proximate the port 150.

In some embodiments, the positioning of the feed chamber 136 may be significant. The feed chamber 136 is positioned upstream of the feedwell 140. As shown in the Figures, the port 150 is located below the surface of the liquid in the feedwell 140. The feed chamber 136 thus creates a pressure differential (sometimes referred to as a "head") between the incoming feed pipe 130 and the feedwell 140. This means that the slurry upstream of the port 150 (e.g., such as in the feed pipe 130) is at a greater pressure than the slurry downstream of the port 150 (e.g., in the feedwell 140). This pressure differential is created because of the small surface area associated with the port 150 through which the slurry must flow. However, the restriction to flow is overcome by pressure buildup behind the port 150, as manifested in an increased water level in the feed chamber 136.

The area of the feed chamber 136 opening into the feedwell 140 (e.g., proximate the port 150) may have smaller cross sectional area than other areas of the feed chamber 136. The reason for this is to create a flow resistance proximate the port 150. When the slurry 184 enters the feed chamber 136, the slurry 184 will generally follow the path having the lowest amount of resistance, and as the resistance to flow is higher in areas experiencing higher flow rates, because of associated turbulence and frictional losses, than areas of lower flow rates, the lower flow areas will attract more flow of the incoming slurry 184. In turn, this flow pattern operates to balance the flow through the feed chamber 136 (provided that the resistance to flow is sufficient) such that a balanced flow in all areas of the chamber 136 may be achieved.

The use of the feed chamber 136 upstream of the feedwell 140 also dissipates some of the feed stream energy by way of the induced headloss created by the port 150. Specifically, there is energy associated with the flow of the slurry 184 through the feed pipe 130. All or a portion of this kinetic energy is dissipated by turbulence and friction in the feed chamber 136 (and the fact that the feedwell 140 is at a lower pressure than the feed chamber 136). As such, additional steps to dissipate the flow energy within the sedimentation vessel 100 may not need to be taken.

After flowing through the port 150, the slurry 184 enters the feedwell 140. In some embodiments, the flow out of the feed chamber 140 is directed radially outward toward the wall 230 of the feedwell. As shown by the arrows 240, the flow of the slurry is diagonally downward and outward (radial) from the feed chamber 136. At the same time, a lower wall 250 of the feedwell 140 is tapered (angled) toward the center 260 of the sedimentation vessel. This means that the lower wall 250 tapers inwardly. The outlet 166 is positioned at the bottom of the lower wall 250. Accordingly, after flowing outward toward the wall 230, the flow path of the slurry 184 has to change direction back toward the center of the sedimentation device in order to pass by the inwardly tapered lower wall 250 (as shown by the arrows 241). The outlet 166 of the feedwell 140 is an open bottom so that the slurry can exit the feedwell 140 into the sedimentation vessel. By making the slurry 184 flow in this manner, the possibility that there will be an uneven distribution of flow throughout the sedimentation vessel is reduced.

Figure 3A:
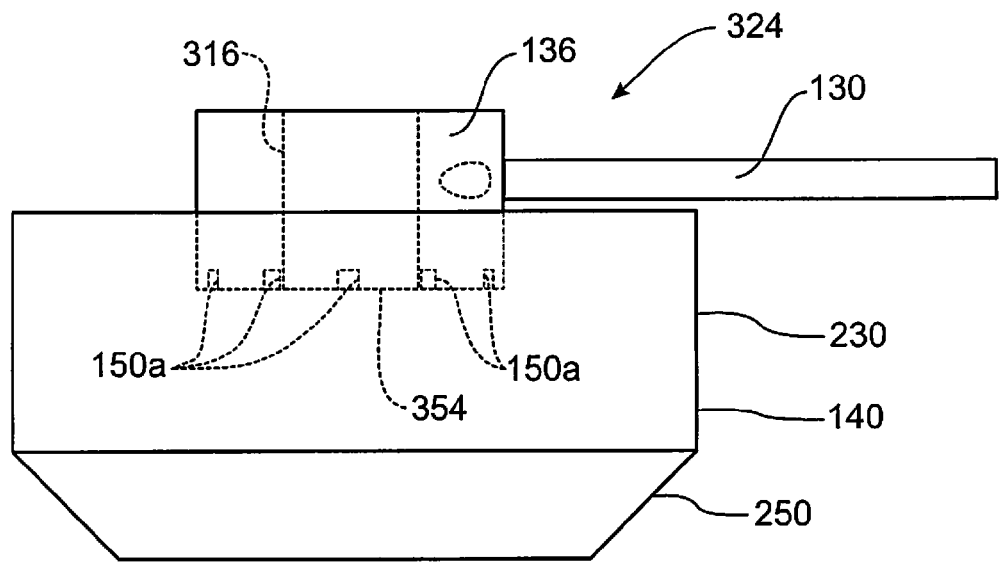
FIG. 3A is cross-sectional view of another embodiment of a feed system that may be used in the sedimentation vessel of FIG. 1.
Figure 3B:
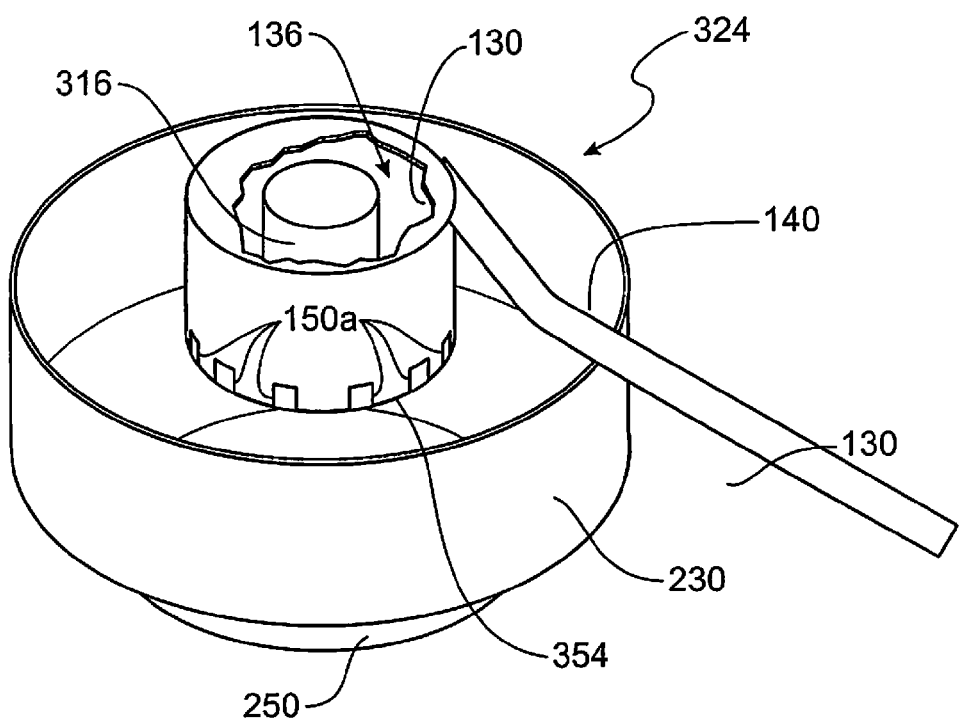
FIG. 3B is a perspective view of the embodiment of the feed system of FIG. 3A.

FIGS. 3A and 3B show another embodiment of a feed structure 324 that may be used in conjunction with the sedimentation vessel 100 of FIG. 1. The feed structure 324 is similar to the feed structure 124 previously described. For purposes of brevity, this description will not be repeated.

The feed structure 324 includes a feed pipe 130 that distributes a quantity of feed slurry 184 (shown in FIG. 1) into the feed chamber 136. The feed chamber 136 includes one or more ports 150a through which the slurry 184 (not shown) may pass to enter the feedwell 140. Unlike the embodiment described above, the ports 150a do not comprise a continuous gap in the feed chamber 136. Rather, the ports 150a comprise one or more openings (such narrow openings) that are distributed proximate the bottom floor 354 of the feed chamber 136 through which the slurry 184 may flow to enter the feedwell 140.

Further, in the embodiment shown in FIGS. 3A and 3B, the feed chamber 136 includes a central wall 316. However, unlike the embodiment discussed above, the central wall 316 is cylindrical in shape rather than conical. There is not a tapered configuration in the diameter of the central wall 316 (as is present in the wall 216). Rather, the slurry 184 will enter the feed chamber 136, contact the central wall 316, and flow out of the ports 150a into the feedwell 140.

Referring now to all of the Figures, specific advantages of the present embodiments will now be discussed. A typical problem associated with the use of a feedwell is the uneven flow of the slurry out of the feedwell. (This problem is sometimes referred to as "short-circuiting" the feedwell, as indicated above). An optimal flow pattern out of a circular feedwell results in substantially equal amounts of the slurry flow out around the entire circumference (e.g., 360 degrees) of the feedwell. However, short-circuiting occurs when a disproportionate amount of the slurry flows out of one area of the feedwell. This leads to an inefficient use of the volume of the sedimentation vessel, and thus an inefficient separation process. Short-circuiting may also lead to a premature carry over of solids, meaning that some of the solids 190 will flow over the weir 131 and not separate out from the liquid 187. In order to overcome this inefficiency, the flow rate of the slurry must be adjusted and/or additional chemicals (such as coagulation or flocculation chemicals) must be added. However, changing the flow rate and/or using addition chemicals add to the costs of the overall process.

Figure 4A:
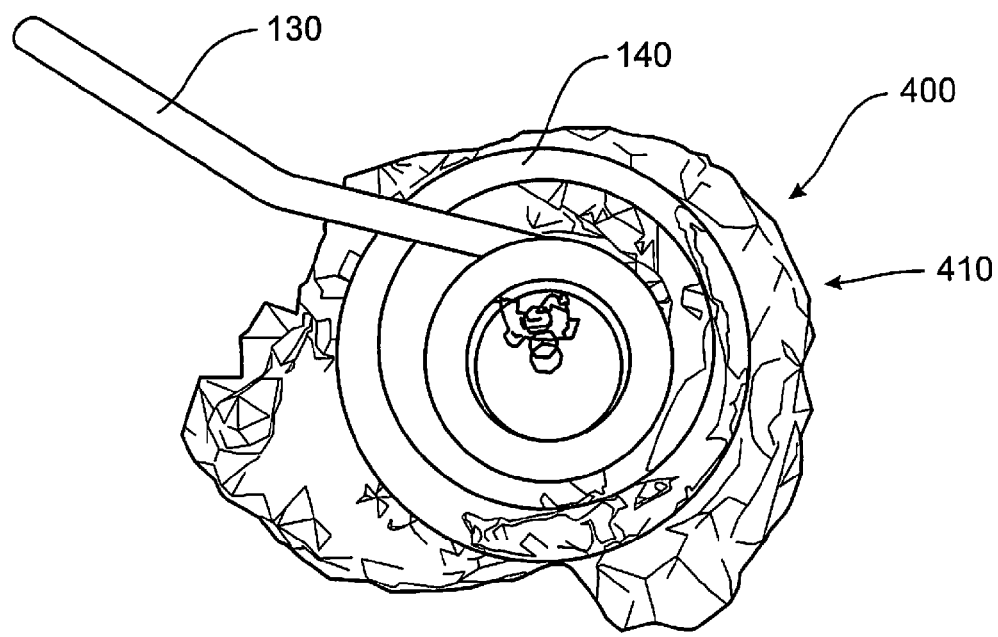
FIG. 4A is a top view of the embodiment of the feed system of FIG. 2A showing the flow pattern of the slurry out of the feedwell.
Figure 4B:
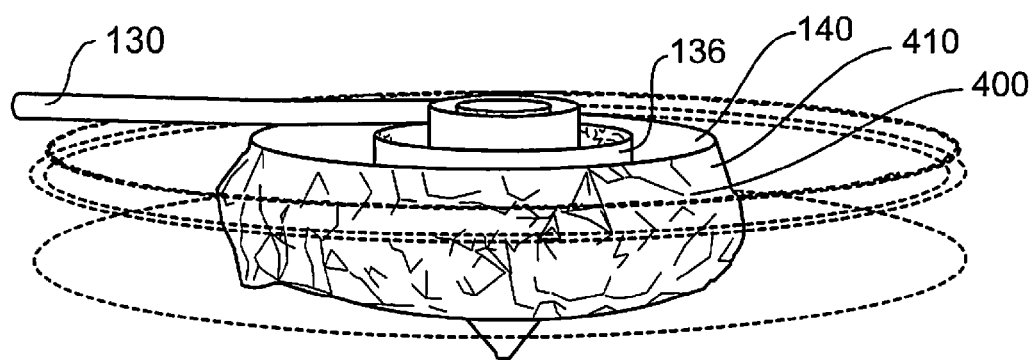
FIG. 4B is a side view of the flow pattern of FIG. 4A.

The present embodiments address the issues associated with short-circuiting. FIGS. 4A-4B show a flow pattern 400 of the slurry 184 using the embodiment of FIG. 1. (A similar flow pattern diagram is associated with the embodiment of FIG. 3A). As shown by these Figures, the slurry 184 flows out of the feedwell 140 in a substantially even manner, such that substantially even amounts of slurry 184 flow out of the entire circumference (e.g., 360 degrees) of the feedwell 140. This flow pattern 400 can be described as having a concentric profile 410, which means that the flow pattern approximates a series of concentric rings formed as the slurry 184 flows outward from the feedwell 140. This flow pattern allows for a more efficient use of the volume of the sedimentation vessel 100. (The flow pattern for a sedimentation vessel 100 that is short-circuited would have a disproportionate amount of slurry 184 flowing out of a side of the feedwell 140).

Figure 5:
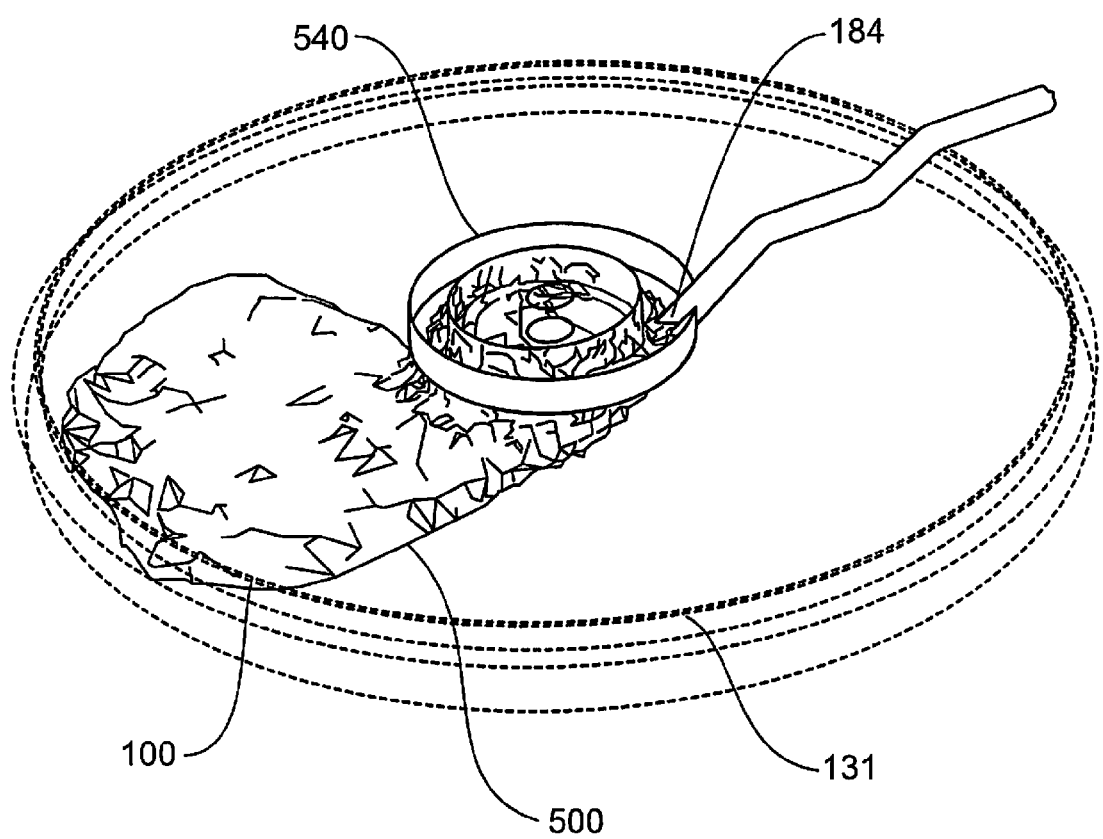
FIG. 5 is a perspective view of an embodiment showing the flow pattern of the slurry out of a sedimentation vessel.

FIG. 5 shows a flow pattern 500 of the slurry 184 using the embodiment of a typical, industry standard, feedwell 540 arrangement. As shown by this figure the flow distribution pattern 500 of slurry is directed to the one side of the sedimentation vessel 100. By not using the entirety of the settlement area provided by the sedimentation vessel the effective rise rate (Area of the sedimentation vessel divided by the feed flow rate) is increased. The higher net rise rate allows fine particles 190 to be carried over the weir 131. To counteract the premature carryover of solids 190 either more chemical reagent 163 must be added, which has a cost implication or the feed 184 flow rate must be reduced which may have the effect of lost production.

The present embodiments also relate to a method for increasing efficiency within a sedimentation device 100. This method comprises obtaining a feedwell 140, the feedwell 140 comprising an outlet 166 through which slurry 184 may flow into a sedimentation vessel 100. The method also comprises obtaining a feed chamber 136, the feed chamber 136 comprising a central wall 216 or 316, and at least one port 150 and/or 150a positioned at the base 154 of the feed chamber 136. The feed chamber 136 is installed proximate the feedwell 140 such that when installed, the slurry 184 will pass through the feed chamber to the port 150 or 150a, into the feedwell 140 via the port 150 and/or 150a, through the feedwell 140 to the outlet 166, and through the outlet 166 into the sedimentation vessel 100. The process method is that the feed 184 is firstly evenly distributed into the feedwell 140, then dilution water 187 is added through ports 172 (if required) and mixed with the feed. The chemical reagent can be added at the ports 172 or anywhere in the feedwell 140. The liquid 187, feed slurry and chemical reagent 163 are mixed in the body of the feedwell 140. The flocculated solids are then introduced into the separation zone 118 in an even flow rate through opening 166. In some embodiments, this method may be performed by retro-fitting an existing sedimentation device having a feedwell with a feed chamber 136.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A feed structure for use with a sedimentation vessel, the feed structure comprising:
   a feed chamber housing a central wall, wherein at least one port is positioned at a base of the feed chamber
   a feedwell that is substantially concentric with the feed chamber, wherein the feed chamber is in communication with the feedwell, wherein slurry flows through the said port to access the feedwell; and
   an outlet positioned on the feedwell, wherein slurry flows through the outlet into the sedimentation vessel;
   wherein the central wall is conical in shape and comprises a top portion and a tapered portion that increases in diameter towards the base of the feed chamber, wherein the port is positioned proximate the bottom of the tapered portion.

2. A feed structure as in claim 1, wherein the port is a continuous gap that extends around the entire circumference of the feed chamber.

3. A feed structure as in claim 1, further comprising additional ports positioned at the base of the central wall.

4. A feed structure as in claim 1, wherein the tapered portion causes the slurry to flow generally radially and downward when passing through the port into the feedwell.

5. A feed structure as in claim 1, wherein the feedwell comprises a lower wall that tapers toward the center of the sedimentation vessel, wherein the outlet is positioned at the bottom of the lower wall.

6. A feed structure as in claim 1, further comprising a pipe through which flocculation chemicals may be added to the slurry in the feedwell.

7. A feed structure as in claim 1, wherein the feedwell is configured such that the slurry exiting the feedwell has a concentric flow pattern within the sedimentation vessel.

8. A feed structure as in claim 1, further comprising a feed pipe, the feed pipe being configured such that the slurry flows through the feed pipe and directly enters the feed chamber.

9. A feed structure as in claim 1, wherein at least part of the feed chamber is positioned above the feedwell and wherein the port is positioned below the level of liquid in the sedimentation vessel, wherein the level of slurry in the feed chamber is higher than the level of liquid in the sedimentation vessel.

10. A feed structure as in claim 1, wherein the outlet is positioned at the bottom of the feedwell.

11. A method for increasing efficiency within a sedimentation vessel, the method comprising:
    distributing a slurry into a feed chamber, the feed chamber comprising a central wall and at least one port positioned at the base of the feed chamber;
    passing the slurry through the feed chamber into a feedwell, wherein the slurry passes through the port to access the feedwell, wherein the feedwell is substantially concentric with the feed chamber;
    optionally mixing dilution liquid and/or chemicals with the slurry in the feedwell;
    passing the slurry from the feedwell via an outlet into the sedimentation vessel, wherein the slurry passes into the sedimentation vessel at a substantially uniform velocity rate such that the slurry in the sedimentation vessel has a concentric flow pattern; and
    wherein the central wall is conical in shape and comprises a top portion and a tapered portion that increases in diameter towards the base of the feed chamber, wherein the port is positioned proximate the bottom of the tapered portion.

12. A method as in claim 11, wherein the feed chamber is retro-fit onto an existing feedwell.

13. A method as in claim 11, wherein the feed chamber is installed such that slurry flows generally diagonally when passing through the port into the feedwell.

14. A method for increasing efficiency within a sedimentation vessel, the method comprising:
    obtaining a feedwell, the feedwell comprising an outlet through which slurry may flow into a sedimentation vessel;
    obtaining a feed chamber, the feed chamber comprising a central wall and at least one port positioned at the base of the feed chamber;
    installing the feed chamber proximate the feedwell such that when installed, the slurry will pass through the feed chamber to the port, through the port to access the feedwell, through the feedwell to the outlet, and through the outlet into the sedimentation vessel; and
    wherein the central wall is conical in shape and comprises a top portion and a tapered portion that increases in diameter towards the base of the feed chamber, wherein the port is positioned proximate the bottom of the tapered portion.

15. A feed structure as in claim 1, wherein the port is defined between the tapered portion of the central wall and an outer wall of the feed chamber.

16. A feed structure as in claim 15, wherein the port is positioned proximate a lower circumference of the feed chamber.

* * * * *

UNITED STATES PATENT AND TRADEMARK OFFICE
CERTIFICATE OF CORRECTION

| | |
|---|---|
| PATENT NO. | : 8,182,701 B2 |
| APPLICATION NO. | : 12/633527 |
| DATED | : May 22, 2012 |
| INVENTOR(S) | : Philip Lake et al. |

It is certified that error appears in the above-identified patent and that said Letters Patent is hereby corrected as shown below:

Column 1, line 31, delete "form" and insert therefor --from--.

Column 1, line 53, delete "were" and insert therefor --where--.

Column 3, line 14, between "minimizing" and "ability" insert --the--.

Column 8, line 41, delete "addition" and insert therefor --additional--.

Signed and Sealed this
Sixth Day of November, 2012

David J. Kappos
*Director of the United States Patent and Trademark Office*